United States Patent [19]

Tateno

[11] 4,151,818
[45] May 1, 1979

[54] IGNITION TIMING ADJUSTING SYSTEM FOR SPARK-IGNITION INTERNAL COMBUSTION ENGINES

[75] Inventor: Hidenori Tateno, Nagoya, Japan

[73] Assignee: Toyota Jidosha Kogyo Kabushiki Kaisha, Aichi, Japan

[21] Appl. No.: 871,997

[22] Filed: Jan. 24, 1978

Related U.S. Application Data

[63] Continuation of Ser. No. 628,818, Nov. 4, 1975, abandoned.

[30] Foreign Application Priority Data

Nov. 6, 1974 [JP] Japan .................. 49-127231

[51] Int. Cl.² ............................................. F02P 5/04
[52] U.S. Cl. ............................................. 123/117 A
[58] Field of Search ................................. 123/117 A

[56] References Cited

U.S. PATENT DOCUMENTS

| | | | |
|---|---|---|---|
| 2,383,898 | 8/1945 | Udale | 123/117 A |
| 2,384,693 | 9/1945 | Olson | 123/117 A |
| 3,521,609 | 7/1970 | Kashiwagi et al. | 123/117 A |
| 3,561,411 | 2/1971 | Vasilescu et al. | 123/117 A |
| 3,678,907 | 7/1972 | Vartanian | 123/117 A |
| 3,828,743 | 8/1974 | Ludwig | 123/117 A |
| 3,888,221 | 6/1975 | Staley, Jr. | 123/117 A |
| 3,948,232 | 4/1976 | Gould et al. | 123/117 A |
| 3,982,553 | 9/1976 | Johnson et al. | 123/117 A |

Primary Examiner—Ronald H. Lazarus
Assistant Examiner—Tony M. Argenbright
Attorney, Agent, or Firm—Kenyon & Kenyon

[57] ABSTRACT

This discloses an ignition timing adjusting system for spark-ignition internal combustion engines, which realizes an advance in ignition timing in relation to altitude or vertical height at which an engine is operating. This system comprises vacuum advance means responsive to a vacuum produced by the vacuum in the intake tube of the engine for advancing the ignition timing of the engine, and means for controlling the level of said vacuum produced by said intake tube vacuum in relation to the engine operating altitude. When the engine is operating at a higher altitude than that for which the ignition timing was originally set, the timing is advanced, under control of said vacuum level controlling means, to a position which is proper for the operation of the engine at such an altitude.

7 Claims, 8 Drawing Figures

IGNITION TIMING ADJUSTING SYSTEM FOR SPARK-IGNITION INTERNAL COMBUSTION ENGINES

This is a continuation of application Ser. No. 628,818 filed Nov. 4, 1975, now abandoned.

BACKGROUND OF THE INVENTION

1. Field of the Invention

The present invention relates to an ignition timing adjusting system for a spark-ignition internal combustion engine, and more particularly, to a system for realizing an advance of the spark or ignition timing in relation to an altitude (that is, a height above sea level) at which the engine is operating. Said system is also called an "altitude compensating system" herein.

It is well-known that the ignition timing of a spark-ignition engine should be varied according to different operating conditions in order to ensure the most effective and smoothest operation of the engine. In an engine for automobiles, for example, the normal ignition timing is generally preset so that an effective and smooth operation can be achieved when the engine is idling and warm. Accordingly, at higher speeds, under a partial-load (or part-throttle) operating condition, or when the engine is cold, the ignition timing should be advanced.

Further, it is well-known that when the engine is operating at a relatively higher altitude the ignition timing should be considerably advanced, as compared with the case when the engine is operating at a low altitude, because the air is rarer at higher altitudes. The normal ignition timing of an engine for automobiles, for example, is generally selected so as to be proper for engine operation at low altitudes, because it is there that automobiles are normally used. Sometimes, however, automobiles are used at higher altitudes with the ignition timing being present for the engine operation at low altitudes, since conventional engines are provided with no system for adjusting the ignition timing in relation to the engine operating altitude. If the engine is operating at a higher altitude than that for which the ignition timing was set, a lag in ignition results in a decrease in the output power, thus making engine response and performance poor. In addition, such operation results in an increase in the quantity of harmful constituents contained in the exhaust gas. If the engine is operating at a lower altitude than that for which the ignition timing was set, pre-ignition will bring about early breakdown of engine parts. In addition, such operation also results in an increase in the quantity of harmful constituents contained in the exhaust gas.

2. Description of the Prior Art

There are many types of known ignition timing adjusting systems. One of the most well-known is a vacuum advance mechanism which comprises a vacuum actuator, linked to a rotatable breaker plate of the spark distributor and which vacuum actuator responds to a vacuum produced in the intake tube so as to rotate said breaker plate, thereby advancing the ignition timing. However, while a conventional vacuum advance mechanism can realize the ignition timing advance in relation to the load condition of the engine, it can not do so in relation to the engine operating altitude.

Another well-known type of system is an electrical advance mechanism. This comprises two or more sets of breaker points incorporated in the distributor and an electrical switching device for selecting any one of said sets of breaker points, thereby providing a proper ignition timing advance. This mechanism may be adapted for adjusting the ignition timing in relation to the engine operating altitude, by controlling said switching device in relation to the engine operating altitude. However, this system has disadvantages. The electrical switching elements are very expensive and service and maintenance thereof are hard to obtain because adjusting or repairing of two or more sets of breaker points is very difficult and time consuming.

SUMMARY OF THE INVENTION

It is, therefore, a primary object of the present invention to provide a novel and improved ignition timing adjusting system having a function of realizing the ignition timing advance in relation to the engine operating altitude, that is, an altitude compensating function. Another object of the present invention is to provide a basically mechanical advance system for realizing the ignition timing advance in relation to the engine operating altitude, which is inexpensive, has a high level of reliability in operation and is easy to service and maintain.

A further object of the present invention is to provide an advance system which has, in addition to said altitude compensating function, a function of realizing the ignition timing advance in relation to the load condition of the engine, that is, a load compensating function.

A still further object of the present invention is to provide an advance system which has, in addition to said altitude compensating function and said load compensating function, a further function of realizing the ignition timing advance in relation to the temperature of the engine, that is, a temperature compensating function.

These and other objects have been achieved by the system according to the present invention, which comprises vacuum ignition timing advance means attached to the distributor of the engine and responsive to a vacuum produced by the vacuum in the intake tube of the engine, and means for controlling the level of said vacuum produced by said intake tube vacuum in relation to the engine operating altitude.

In a primary embodiment, said vacuum advance means comprises a vacuum actuator linked to a rotatable breaker plate of the distributor. The vacuum chamber of said actuator is connected to a vacuum port in the intake tube of the engine by a vacuum line and, also, to the atmosphere via an atmospheric pressure line. Said vacuum level controlling means comprises a one-way valve arranged along said vacuum line and an atmospheric pressure responsive valve arranged along said atmospheric line. Said one-way valve is opened and closed when the level of said intake tube vacuum is higher and lower, respectively, than that of the vacuum in the actuator chamber. Said atmospheric pressure responsive valve is opened and closed when the atmospheric pressure is higher and lower, respectively, than a preselected one.

When the engine is operating an relatively higher altitudes, said atmospheric pressure responsive valve is closed, whereby the same level of vacuum as the intake tube vacuum is produced in the vacuum chamber of said actuator. This vacuum causes the actuator to rotate the breaker plate, thereby realizing the ignition timing advance proper for engine operation at such relatively high altitudes.

Said one-way valve functions to maintain the level of said vacuum produced in the actuator chamber even if the level of the intake tube vacuum is lowered, due to different operating conditions, whereby the advanced ignition timing can be maintained during operation at high altitudes.

The above-mentioned and the other objects, features, and advantages of the present invention will be more apparent from the following description of the preferable embodiments of the invention with reference to the accompanying drawings.

DETAILED DESCRIPTION OF PREFERRED EMBODIMENT

Figure 1:
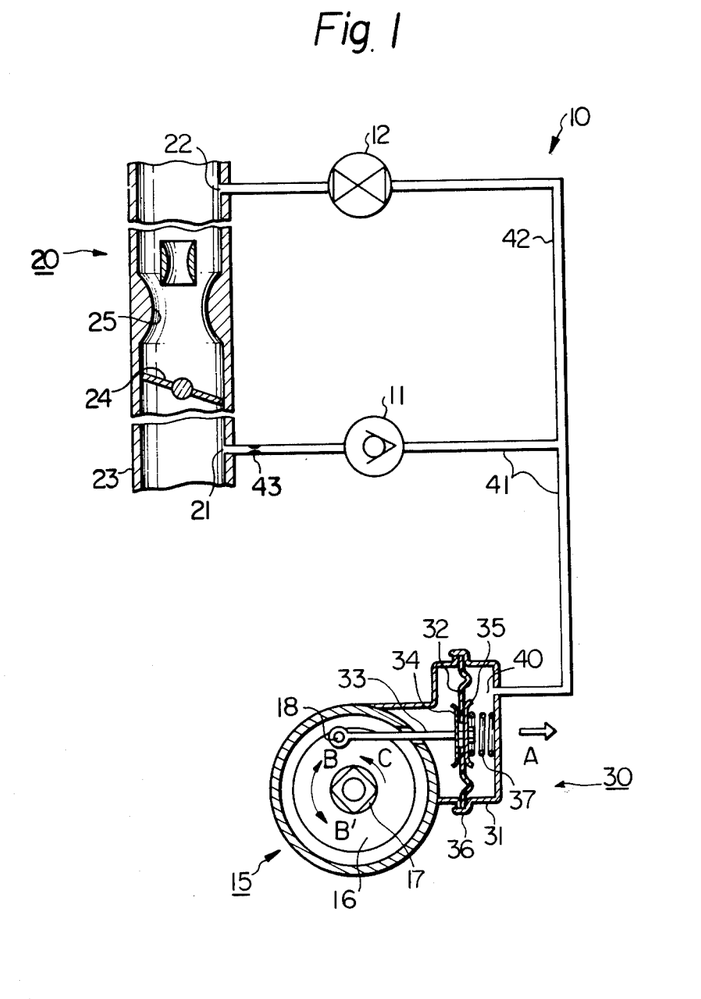
FIG. 1 diagramatically illustrates an ignition timing adjusting system according to the present invention.

Referring to the Figures, FIG. 1 shows a primary arrangement of the ignition timing advance system according to the present invention. This system, indicated generally by the numeral 10, comprises a vacuum advance mechanism 30, and a vacuum level controlling device comprised of a one-way valve 11 and an atmospheric pressure responsive valve 12 (referred to below as a "pressure responsive valve").

Said advance mechanism 30 has basically the same arrangement and function as well-known ones, and comprises a vacuum actuator 31 which is attached to a contact point type distributor 15. The actuator 31 has a spring-loaded diaphragm 32 which is secured to one end of a rod 33 by suitable elements 34 and 35. The other end of said rod 33 is connected to a pin 18 which is fixed to a breaker plate 16 of the distributor 15. The breaker plate 16 is provided with a pair of breaker points (not shown). The actuator 31 has a diaphragm chamber 40 which is defined by the diaphragm 32 and a casing 36. When a vacuum is present in said diaphragm chamber 40, the diaphragm 32 and, thus, the connecting rod 33 are moved by atmospheric pressure against a return spring 37 in the direction of arrow A. This movement causes the breaker plate 16 to rotate in the direction of arrow B. This rotation carries the breaker points of the breaker plate 16 around a breaker cam 17 which is rotating in the direction of arrow C, so that the cam 22 opens and closes the breaker points earlier than normal in the rotating cycle of the cam 17, whereby the ignition timing is advanced. It should be noted that the advance of ignition timing, that is, the rotational angle of the breaker plate 16 may be desirably realized by properly selecting the pressure-receiving area of the diaphragm 32, the stroke of the connecting rod 33, and the stiffness of the return spring 37, in relation to the level of the vacuum, affecting the diaphragm chamber 40. It is also possible to realize a constant advance of the ignition timing for levels of vacuum above a preselected level.

Said diaphragm chamber 40 is connected by a vacuum line 41 to a vacuum port 21 which is formed in the intake tube 23 of the air intake system 20 of the engine. The vacuum port 21 is located relatively downstream from a throttle valve 24 disposed within the intake tube, so that an air intake vacuum is always produced in the region adjacent to the port 21 when the engine is operating. The diaphragm chamber 40 is also connected by an atmospheric pressure line 42, which branches off the vacuum line 41, to a atmospheric pressure port 22 in the air intake system 20. The atmospheric pressure port 22 is located relatively upstream from a carburetor 25, for example, adjacent to or within the air cleaner, so that the air pressure in the region adjacent to the port 22 is substantially equal to the atmospheric pressure at the altitude at which the engine is operating.

Said one-way valve 11 is a well-known type of check valve permitting a fluid-flow therethrough in one direction. The valve 11 is arranged along the vacuum line 41 between the vacuum port 21 and the branching-off point of the atmospheric line 42, so as to permit the air to flow through the vacuum line 41 in the direction from the diaphragm chamber 40 to the vacuum port 21, but not in the reverse direction. Therefore, when the level of the intake tube vacuum is higher than that of the diaphragm chamber vacuum, the valve 11 opens, whereby the air in the diaphragm chamber 40 is sucked through the valve 11 and the port 21 into the intake tube 23. On the other hand, when the level of the intake tube vacuum is equal to or lower than that of the diaphragm chamber vacuum, the valve 11 closes, whereby the diaphragm chamber 40 is isolated from the vacuum port 21.

Said pressure responsive valve 12 is arranged along said atmospheric pressure line 42. This valve 12 is responsive to the atmospheric pressure, and is held in its open and closed positions when the atmospheric pressure is higher and lower, respectively, than a preselected one, as will be described in detail with reference to FIG. 2 and FIG. 3. When the engine is running at relatively low altitudes, the valve 12 is open due to the higher atmospheric pressure, whereby the diaphragm chamber 40 communicates with the atmospheric port 22. When the engine is operating at relatively higher altitudes, the valve 12 is closed due to the lower atmospheric pressure, whereby said diaphragm chamber 40 is isolated from said port 22.

Said valves 11 and 12 cooperate so as to produce a level of vacuum in the diaphragm chamber 40 equal to the highest level of the intake tube vacuum, and to maintain or keep the same during the time the engine is operating at relatively high altitudes, as will be described later.

Preferably, a flow restrainer 43 is arranged in the vacuum line 41 between the vacuum port 21 and the one-way valve 11. This restrainer 43 has a function of restricting the amount of air which is sucked from the atmospheric port 22 into the intake tube 23 through the one-way valve 11 and the vacuum port 21 when the atmospheric pressure line 42 is opened by the valve 12. This prevents effectively a vacuum being produced upstream from the restrainer 43, thereby ensuring that the diaphragm chamber 40 is subjected to atmospheric pressure when the valve 12 is opened. The restrainer 43 has another function of preventing a large quantity of air being sucked into the intake tube 23 at one time when the atmospheric line 42 is opened. This prevents the air-fuel ratio of the mixture to be supplied to the engine from becoming improperly lean.

The above-described system 10 operates as follows. It is assumed that the ignition timing of the engine is properly present for low altitudes. When the engine is operating at low altitudes, the atmospheric pressure responsive valve 12 is opened due to high atmospheric pressure and the diaphragm chamber 40 of the vacuum actuator 31 is subjected to atmospheric pressure from the atmospheric port 22, as mentioned before. Accordingly, the vacuum advance mechanism 30 does not operate, whereby the ignition timing can be properly maintained for engine operation at low altitudes. When the engine is operating at high altitudes, since the valve 12 is closed due to a lowering of the atmospheric pressure, the one-way valve 11 opens due to the air intake vacuum from the vacuum port 21. Accordingly, said air intake vacuum sucks the air from the diaphragm chamber 40 into the intake tube 23, through the one-way valve 11 and the restrainer 43, whereby a vacuum having a level equal to that of the intake tube vacuum in the region adjacent to the port 21 is produced in the diaphragm chamber 40. As a result, as described hereinbefore, the vacuum actuator 31 operates so as to rotate the breaker plate 16 in the direction of arrow B, whereby the ignition timing is advanced to the proper position for engine operation at high altitudes.

The level of the vacuum produced in the diaphragm chamber 40 in maintained, even if the level of the intake tube vacuum is lowered, for example, due to a wide-open throttle (or full-load) operating condition, by the aforementioned function of the one-way valve 11. Consequently, said proper advance of the ignition timing can be maintained while the engine is operating at high altitudes.

When the engine is operating at low altitudes again, the atmospheric pressure responsive valve 12 opens again and, thus, the diaphragm chamber 40 is subjected to atmospheric pressure. Accordingly, the breaker plate 16 of the distributor 15 is rotationally returned in the direction of arrow B', whereby the ignition timing is returned to the normal position proper for operation of the engine at low altitudes.

As mentioned above, said ignition timing adjusting system 10 realizes the proper advance of the ignition timing for engine operation at high altitudes. Thereby said system 10 provides many advantages, such as an increase in the output power, an improvement in fuel-consumption and clean exhaust gas, and, further, it enhances engine response and performance.

Figure 2:
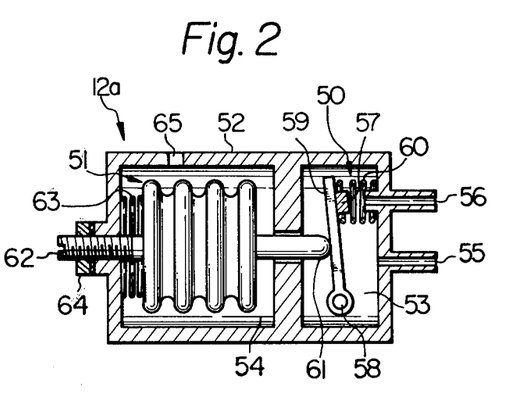
FIG. 2 is a sectional view of a mechanical atmospheric pressure responsive valve.

Embodiments of the above-mentioned atmospheric pressure responsive valve 12 will be described with reference to FIGS. 2 and 3. FIG. 2 illustrates a mechanical valve 12a. This valve comprises a poppet type valve 50 and an air-tight bellows 51 for operating said valve 50. The valve 50 and the bellows 51 are accomodated in respective compartments 53 and 54 of a valve casing 52. The valve compartment 53 has an inlet 55 and outlet 56. The inlet 55 communicates with the atmospheric port 22, shown in FIG. 1, while the outlet 56 communicates with the diaphragm chamber 40 of the vacuum actuator, shown in FIG. 1. The valve element 57 of the valve 50 is fixed to a valve arm 59 which is pivoted to a fixed pin 58, and the valve 50 is normally open due to the effect of a return spring 60. The bellows 51 is carried by the casing 52 by means of its end rods 61 and 62. The end rod 61 pases slidably through the wall of casing 52 into the valve compartment 53 and abuts against the valve arm 59. The other end rod 62 is threaded and is engaged with an adjustor 64. The bellows 51 is biased to the right in FIG. 2 by a spring 63. The bellows compartment 54 is in communication with the atmosphere through an opening 65 formed in the casing 52, and the bellows 51 expands and contracts in response to the lowering and the rising of the atmospheric pressure, respectively.

When the atmospheric pressure is high, that is, at low altitudes, the bellows 51 contracts and the valve 50 opens. Accordingly, atmospheric pressure from the port 22 (FIG. 1) is introduced into the diaphragm chamber 40 of the actuator 31 through said valve 50. When the atmospheric pressure is low, that is, at high altitudes, the bellows 51 expands and the rod 61 is pushed against the valve arm 59 so as to close the valve 50, whereby the diaphragm chamber 40 is isolated from the atmospheric port 22. The desired opening pressure of the valve 50 may be selected by the adjuster 64. FIG. 3 illustrates an electromechanical valve 12b, which includes a pressure responsive switch 70 and a solenoid valve 75. The switch 70 has a bellows 73 and normally opened electrical contact 74, which are disposed within a casing 71 having an atmospheric port 72. The bellows 73 has the same function as that of the bellows 51, shown in FIG. 2. That is, when the atmospheric pressure is low, the bellows 73 expands and closes the contacts 74. The solenoid valve 75 has a solenoid 79 and an armature 80, which are disposed within a valve casing 76 having an inlet 77 and an outlet 78. A valve element 81 is secured to the armature 80. The inlet 77 and the outlet 78 communicate with the atmospheric port 22 and the diaphragm chamber 40 of the actuator 31, shown in FIG. 1, respectively. The solenoid valve 75 is normally held in its open position due to the effect of a return spring 82, and is held in its closed position when energized. The switch 70 and the solenoid valve 80 are connected in series with a battery 83 through an ignition switch 84 of the engine. It should be noted that said electrical circuit includes an electrical controller 85, which will be described in detail later.

On the assumption that both the ignition switch 84 and the controller 85 are closed, when the atmospheric pressure is high (that is, at low altitudes), the contacts 74 are open and, thus, the solenoid 79 is not energized Accordingly, the solenoid valve 75 is open and, thus, the diaphragm chamber 40 communicates with the atmospheric port 22. When the atmospheric pressure is low (that is, at high altitudes), the contacts 74 are closed, the solenoid valve 75 is energized, and the solenoid valve is then closed, whereby the diaphragm chamber 40 is isolated from the atmospheric port 22.

Figure 3:
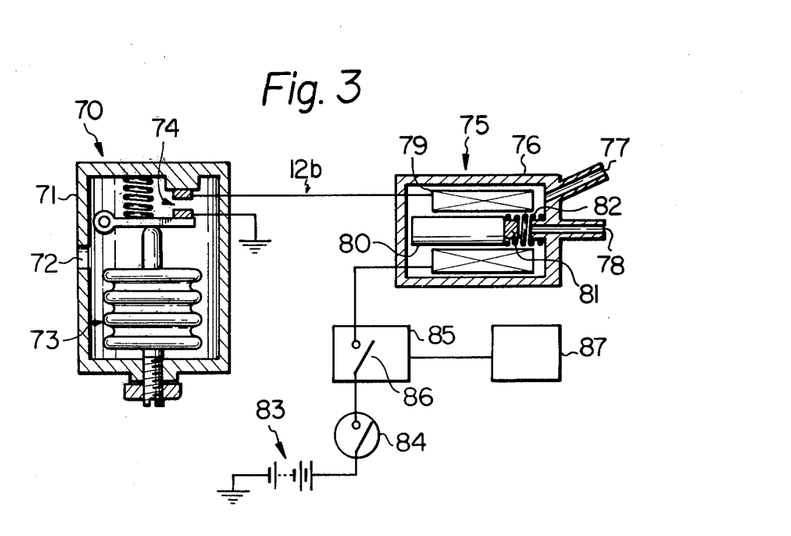
FIG. 3 diagramatically illustrates a electromechanical atmospheric pressure responsive valve with an electrical controlling device.

It should be understood that the present invention can be realized by employing other known atmospheric pressure responsive valves than the aforementioned type of valves shown in FIGS. 2 and 3.

The above-mentioned electrical controller 85 serves the following purpose. There are some conventional engines which do not require a large advance of the ignition timing under high speed operating conditions even at high altitudes. In this case, the ignition timing advance which is realized by the system 10 is too large and, therefore, undesirable. In order to prevent said undesirable advance, said controller 85 controls the solenoid valve 75 so that it opens and closes in relation to the engine speed (that is, the number of revolutions). The controller 85 has a switch 86 which is associated with an engine speed detector 87. The switch 86 opens and closes when the engine speed is higher and lower, respectively, than a preselected engine speed. Therefore, even if the engine is operating at high altitudes the solenoid valve 75 is open under the high speed operating condition, whereby the system 10 does not operate, resulting in no-advance of the ignition timing. In automobiles, said engine speed detector 87 may be replaced with a vehicle speed detector, which ensures substantially the same operation as described above. Further, the pressure responsive switch 70 may be replaced by a manual switch, which makes the system construction simple, although the solenoid valve 75 can not be controlled automatically in relation to the altitude at which the engine is operating.

The above-described system 10 has the altitude compensating function of adjusting the ignition timing in relation to the altitude at which the engine is operating, only. However, as described hereinbefore, in most conventional engines, especially, engines for automobiles, the ignition timing should be adjusted for different engine load conditions. Accordingly, for practical use, a system which has, in addition to said altitude compensating function, a function of adjusting the ignition timing in relation to the engine-load condition (i.e., load, compensating function) is advantageous.

Figure 4:
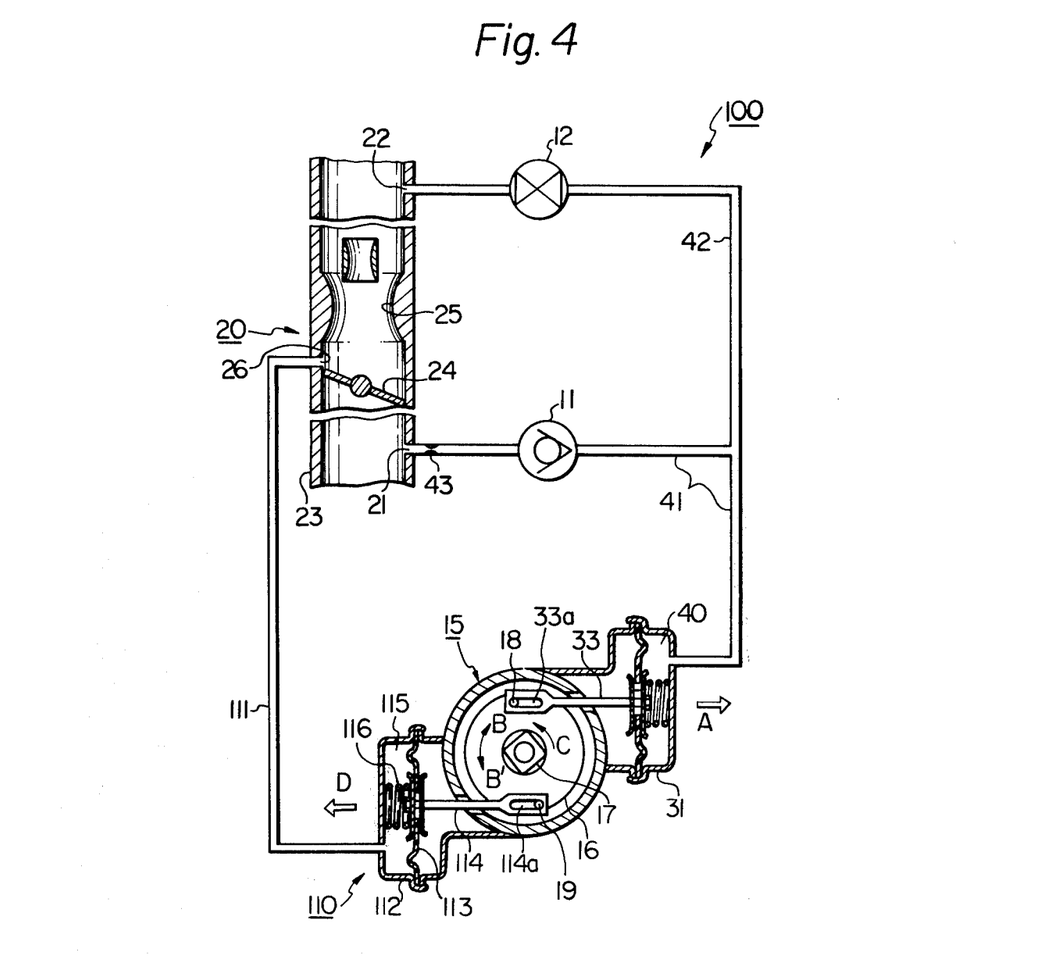
FIG. 4 illustrates another embodiment of the present invention.

FIG. 4 shows a second embodiment according to the present invention, having both the altitude compensating function and the load compensating function. This embodiment operates to advance the ignition timing in relation to the engine load condition during the operation of the engine at low altitudes and to realize a relatively large advance of the ignition timing during the operation of the engine at high altitudes. The system 100 shown in FIG. 4 comprises a vacuum advance mechanism 110 having first and second vacuum actuators 31 and 112, and a vacuum level controlling device comprised of the one-way valve 11 and the atmospheric pressure responsive valve 12. It should be noted that the arrangement and the functions of the first actuator 31 and the valves 11 and 12 are the same as those in the system 10 described hereinbefore with reference FIG. 1. Therefore, they realize the altitude compensating function as described hereinbefore. Accordingly, the following explanation is directed to the difference between the system 100 in FIG. 4 and the system 10 in FIG. 1.

Said second vacuum actuator 112 realized the abovementioned load compensating function. The second actuator 112 has a spring-loaded diaphragm 113 which is secured to a rod 114, which is in turn connected to a fixed pin 19 of the aforementioned breaker plate 16 of the distributor 15. The diaphragm chamber 115 of the actuator 112 is continuously in communication, via a second vacuum line 111, with a second vacuum port 26 in the carburetor 25. This second vacuum port 26 is located just above the throttle valve when the latter is closed, so that a level of vacuum corresponding to the opening condition to the throttle valve 24 is produced in the region adjacent to the port 26. This vacuum sucks the air into the diaphragm chamber 115 via the vacuum line 111 and the port 26, and thereby produces the same level of vacuum as the vacuum adjacent to the port 26 the diaphragm chamber 115. The vacuum in the diaphragm chamber 115 sucks the diaphragm 113 in the direction of arrow D against the effect of a return spring 116, thereby making the breaker plate 16 rotate in the direction of arrow b so as to advance the ignition timing. It is understood that the ignition timing advance in this case is a proportion to the opening condition of the throttle valve 24, that is, to the engine load condition.

The breaker plate 16 of the distributor 15 is connected to the rods 33 and 114 of the respective actuators 31 and 112, and is actuated by either one of said actuators 31 and 112, as will be described later. Accordingly, the connecting rods 33 and 114 of the respective actuators are formed with slots 33a and 114a, respectively, into which the breaker-plate pins 18 and 19, respectively, are slidably inserted, so that the rotational movement of the breaker plate 16 in the direction of arrow B by either one of the actuators 31 and 112 is not prevented by the other. When the connecting rod 33 is moved in the direction of arrow A and/or the connecting rod 114 is moved in the direction of arrow D, the breaker plate 16 is rotated in the direction of arrow B. The return of the breaker plate 16 in the direction of arrow B' is effected by a return spring (not shown) disposed in the distributor 15.

When the engine is operating at low altitudes, as described hereinbefore, the first vacuum actuator 31 does not operate since the diaphragm chamber 40 thereof is subjected to atmospheric pressure introduced from the atmospheric port 22. However, in such a case, the second vacuum actuator 112 operates, due to the vacuum in the diaphragm chamber 115 thereof, so as to rotate the breaker plate 16, whereby the ignition timing is advanced so as to correspond to the engine load condition.

On the other hand, when the engine is operating at high altitudes, the first vacuum actuator 31 as well as the second vacuum actuator 112 operate, due to the vacuum in the diaphragm chamber 40, since the atmospheric pressure responsive valve 12 closes as described hereinbefore. This makes the breaker plate 16 rotate so as to advance the ignition timing. In this case, the position of the breaker plate 16 is determined by whichever actuator is providing the greater movement at that time. However, since the level of the vacuum in the diaphram chamber 40 of the first actuator 31 is equal to the highest level of the intake tube vacuum in the region adjacent to the vacuum port 21, and since this vacuum level in the chamber 40 is maintained during the operation of the engine at high altitudes, the rotating angle of the breaker plate 16 is never smaller than the one determined by the first actuator 31. That is, during the operation of the engine at high altitudes, the ignition timing is advanced to and maintained in a position proper for such high altitude engine operation by the first vacuum actuator 31. Most of the conventional engines require relatively large ignition timing advances for operation at high altitudes as compared with the advances for the engine load condition. This can be easily achieved by suitably selecting the performances of the actuators 31 and 112.

Figure 5:
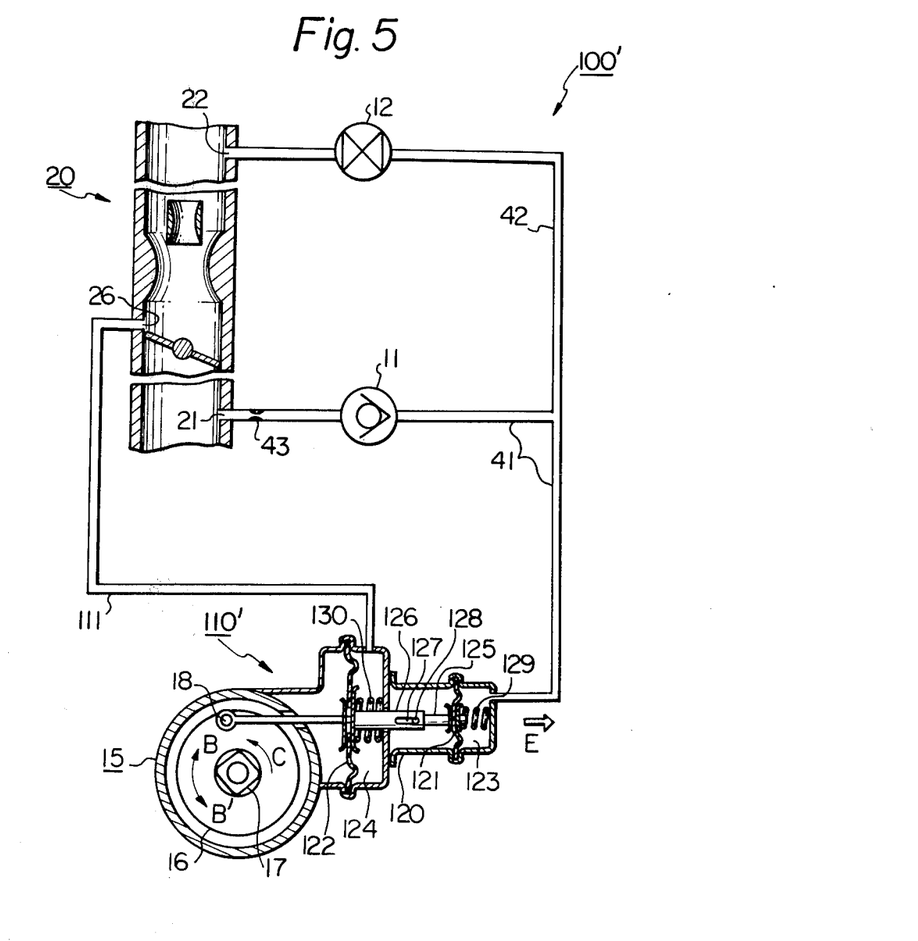
FIG. 5 shows a variation of the embodiment shown in FIG. 4.

The system 100' shown in FIG. 5 is a variation of the above-described system 100. Said system 100' has entirely the same in function as the system 100, although the vacuum advance mechanism is slightly different. In the system 100 of FIG. 4, the advance mechanism 110 has independent vacuum actuators 31 and 112, which make the system expensive and increase the probability of mechanical trouble in the system. In the system 100', on the other hand, the advance mechanism 110' has a single vacuum actuator 120 of such a type as constructed by tandemly combining two actuators into one unit. This actuator 120 has first and second diaphragms 121 and 122, and first and second diaphragm chambers 123 and 124. Said diaphragms 121 and 122 are secured to first and second connecting rods 125 and 126, respectively. The first rod 125 is connected to the second rod 126 by means of a slot 127 and a pin 128 for the axial relative movement of said rods. Said second rod 126 is, in turn, pivotally connected to the pin 18 of the breaker plate 16. The diaphragms 121 and 122 are normally biased toward the left of FIg. 5 by return springs 129 and 130. When a vacuum is present in either one or both of the diaphragm chambers 123 and 124, the corresponding diaphragm 121 and/or 122 are moved against the return spring 129 and/or 130 in the direction of arrow E and make the breaker plate 16 rotate in the direction of arrow B, thereby advancing the ignition timing. The position of the breaker plate 16, that is, the ignition timing advance, is determined by whichever diaphragm is providing the greater movement of the second connecting rod 126 at that time. The first and second diaphragm chambers 123 and 124 are connected to the first and second vacuum lines 41 and 111, respectively. When the engine is operating at low altitudes, only the vacuum corresponding to the opening condition of the throttle valve 24 is produced in the second diaphragm chamber 124 via the second vacuum port 26 and the line 111. This vacuum makes the second diaphragm 122, and thus the second rod 126, move in the direction of arrow E so as to rotate the breaker plate 16, whereby the ignition timing is advanced so as to correspond to the engine load condition. When the engine is operating at high altitudes, the vacuum produced via the first vacuum port 21 and the line 41 is locked in the first diaphragm chamber 123. This vacuum makes the first diaphragm 121, and thus the first and second rods 125 and 126, move so as to rotate the breaker plate 16 in the direction of arrow B. In this case, the ignition timing advance is never smaller than the one which is achieved by the highest level of vacuum in the first diaphragm chamber 123.

Figure 6:
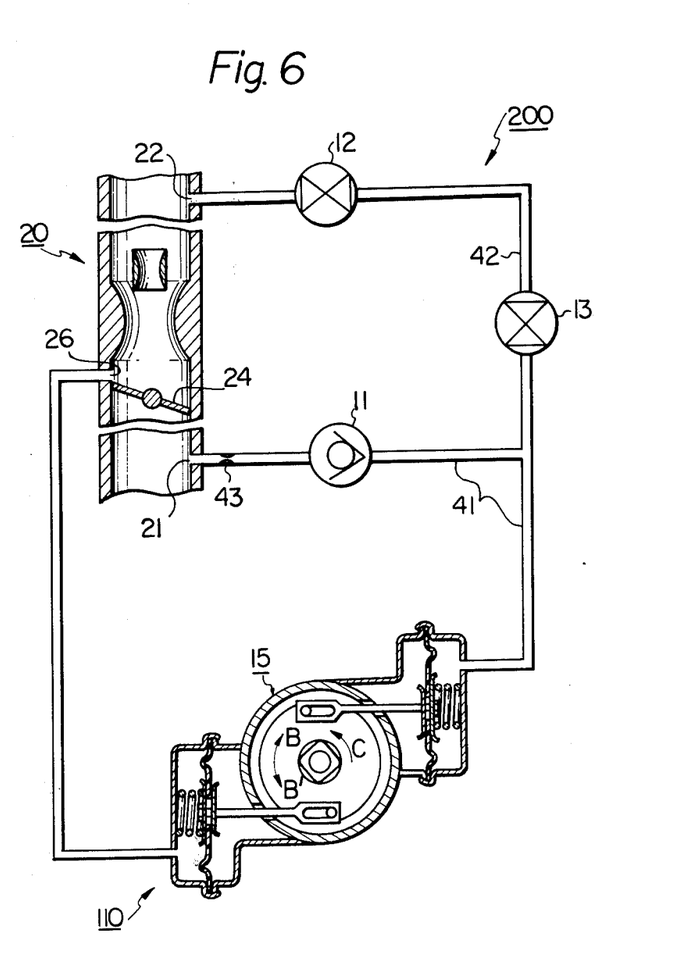
FIG. 6 illustrates a further embodiment of the present invention.

With most conventional engines, operation thereof when the engine is cold requires a relatively large ignition timing advance in order to realize an effective and smooth operation. Fig. 6 shows a third embodiment according to the present invention, which has the altitude compensating functon, the load compensating function and, in addition, a temperature compensating function to adjust the ignition timing in relation to the temperature of the engine. This system 200 is constructed by adding a temperature responsive valve 13 to the vacuum level controlling device in the system 100 shown in FIG. 4. Said valve 13 is a well-known one which has a temperature sensor such as a bimetallic or wax element (not shown). Said temperature sensor is, for example, adapted for detecting the temperature of the cooling water for the engine. The valve 13 is arranged along the atmospheric line 42 in series with the pressure responsive valve 12, and is held in its open position when the engine temperature is higher than a preselected one, that is, when the engine is warm. During operation when the engine is cold, said valve 13 closes the atmospheric pressure line 42, whereby the advance mechanism 110 operates in the same manner as when the pressure responsive valve 12 is closed, regardless of the engine operating altitude. Therefore, the ignition timing is advanced to, and maintained in, a position proper for operation of a cold engine. When the engine warms up, the system 200 operates in exactly the same manner as the one described with reference to the system 100 of FIG. 4, since the temperature responsive valve 13 is open.

Figure 7:
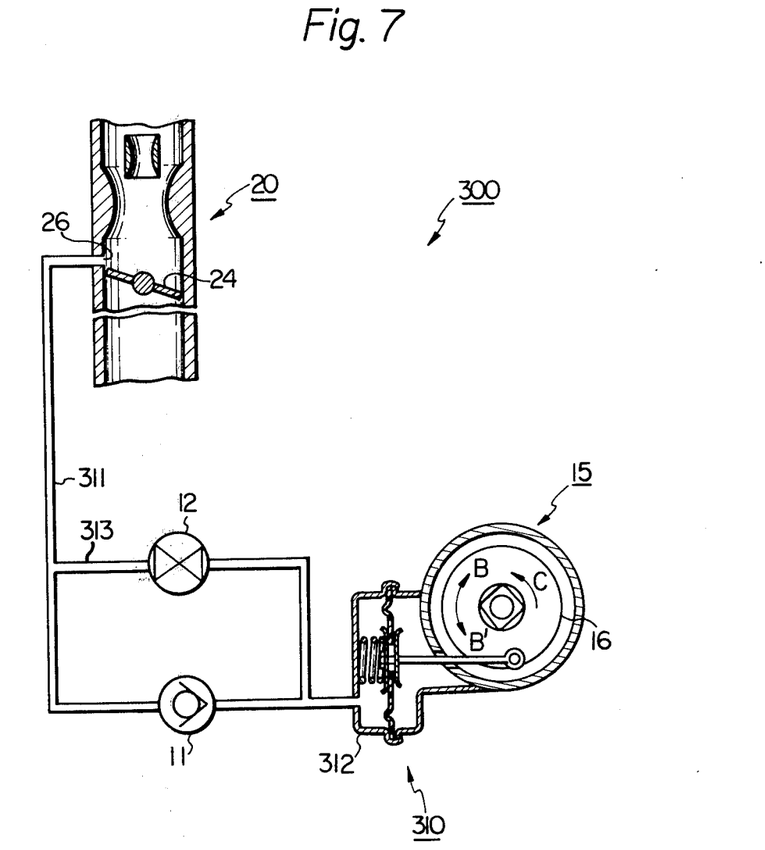
FIG. 7 illustrates a still further embodiment of the present invention.

FIG. 7 shows a further embodiment which has, similarly to the system 100 of FIG. 4, the altitude compensating function and the load compensating function. It should be noted that the above described system 100 is directed to be employed in an engine which requires a relatively large ignition timing advance for operating at high altitudes as compared with one necessary for operating at low altitudes. However, there are some engines in which the advance necessary for operating at high altitudes can be substantially covered by the adjusting range of the ignition timing for the engine load condition. The system 300 shown in FIG. 7 is adapted for employment with such engines.

Said system 300 comprises a vacuum advance mechanism 310, which has only one vacuum actuator 312. The diaphragm chamber of the actuator 312 is connected to the aforementioned vacuum port 26 by first and second vacuum lines 311 and 313. In FIG. 7, the second vacuum line 313 is illustrated as a bypass of the first vacuum line 311. The port 26 is, as mentioned before, located just above the throttle valve 24 when the latter is closed, so that a level of vacuum corresponding to the opening condition of the throttle valve is produced in the region adjacent to the port 26. The one-way valve 11 and the atmospheric pressure responsive valve 12, which are described hereinbefore, are arranged along the first and second vacuum lines 311 and 313, respectively, between the branching-off points of the second vacuum line 313.

When the valve 12 is open at low altitudes, the ignition timing is adjusted so as to correspond to the opening condition of the throttle valve 24, that is, to the load condition of the engine. When the valve 12 is closed at high altitudes, the highest level vacuum produced in the region adjacent to the port 26 is maintained in the diaphragm chamber by the function of the one-way valve 11, and thereby the ignition timing is advanced and maintained in an advanced position during operation of the engine at high altitudes. It is obvious that said advance realized at high altitudes is never larger than the maximum advance which is realized at low altitudes in relation to the engine load condition. As mentioned before, it is not possible to employ said system 300 in every kind of engine. However, the system 300 is very simple in construction and inexpensive in comparison with the system 100 of FIG. 4. In addition, the system 300 is useful for engines in which the advance required at high altitudes is substantially equal to the maximum advance realized in relation to the engine-load condition.

Figure 8:
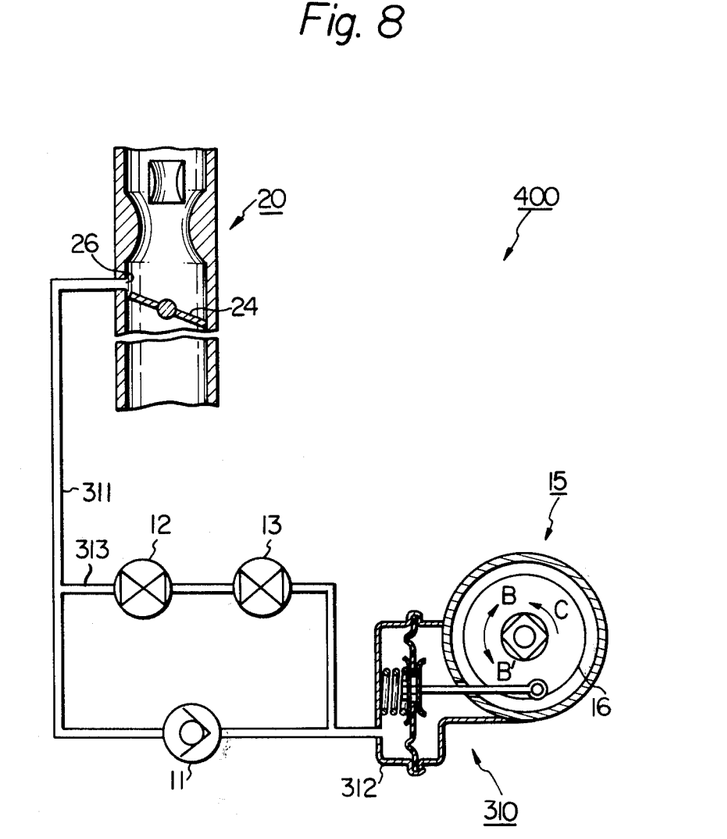
FIG. 8 show a variation of the embodiment shown in FIG. 7.

FIG. 8 shows a variation of the above-described system 300. This system 400 comprises a temperature responsive valve 13 which is the same as the one described with reference to the system 200 of FIG. 6. The valve 13 is arranged along the second vacuum line 313 in series with the pressure responsive valve 12. When the engine is cold, the valve 13 is closed and the advance mechanism 310 operates in the same manner as when the pressure responsive valve 12 is closed. Therefore, the ignition timing is advanced to, and maintained in, a position proper for operation of a cold engine. When the engine warms up, the system 400 operates in exactly the same manner as the system 300 of FIG. 7, since the valve 13 is open.

As described above, the ignition timing adjusting system according to the present invention can advance the ignition timing preset for proper engine operation at low altitudes to the proper position for engine operation at high altitudes, and provides many advantages such as an increase in the output power and clean exhaust gas, even during operation of the engine at high altitudes.

The system according to the present invention can also realize the above-mentioned altitude compensation function and, in addition, the load compensating function and/or the temperature compensating function, as mentioned before.

Further, the system according to the present invention is inexpensive, is easy to service and maintain, and ensures a high level of reliability in operation, as compared to a conventional electrical advance mechanism.

The invention has been described in detail with particular reference to preferable embodiments thereof, but it will be understood that other variations and modifications can be realized within the spirit and scope of the invention.

What we claim is:

1. In an ignition timing adjusting system for a spark-ignition internal combustion engine having an ignition timer element, an intake tube for delivering a mixture of fuel and air to the engine, and a throttle valve located in the intake tube, the system including a first vacuum actuator having a first air-tight diaphragm chamber, the first actuator being connected to the ignition timer element of the internal combustion engine for advancing the timing of the engine in response to increasing vacuum in the first chamber, a first vacuum line leading from the first actuator chamber and connected to a first vacuum port located in the intake tube downstream of the throttle valve, and an atmospheric pressure line leading from the first actuator chamber to the atmosphere, wherein the improvement comprises:

first valve means for opening and closing said first vacuum line when the absolute value of the vacuum in the intake tube at the first intake port is greater and less, respectively, than the absolute value of the vacuum in the first actuator chamber;

a second vacuum actuator having a second air-tight diaphragm chamber, the second actuator being connected to the ignition timer element to advance the timing of a spark-ignition internal combustion engine in response to increasing vacuum in the second chamber independently of said first actuator;

a second vacuum line leading from the second chamber and connected to a second vacuum port in the inlet tube of the engine; and second valve means for opening and closing the atmospheric pressure line when the pressure of the atmosphere is greater and less, respectively, than a predetermined pressure corresponding to a preselected altitude, the first actuator being adjusted to provide a maximum ignition timing advance greater than the maximum advance provided by the second actuator, so that whenever the atmospheric pressure is less than said predetermined pressure, the first and second valve means will maintain the vacuum in the first actuator chamber at the maximum value of vacuum at the first vacuum port, whereby the first actuator will provide said maximum ignition timing advance for all engine operating conditions whenever the atmospheric pressure is less than said predetermined pressure, and whenever the first actuator chamber is exposed to atmospheric pressure, the second actuator will provide ignition advance according to engine load.

2. An ignition timing adjusting apparatus according to claim 1 wherein the second vacuum port is located closely upstream of the closed position of the throtte valve for producing a vacuum level in the second vacuum line corresponding to the opening condition of the throttle valve.

3. An ignition timing adjusting apparatus according to claim 1 further comprising air flow restricting means arranged along said first vacuum line for restricting air flow through the first vacuum port into the intake tube when the second valve means is open to assure that the actuator chamber is subjected to atmospheric pressure.

4. An ignition timing adjusting apparatus according to claim 1 wherein said first valve means comprises a one-way valve arranged in the first vacuum line so as to allow air flow therethrough from the first actuator chamber but to prevent flow in the reverse direction.

5. An ignition timing adjusting apparatus according to claim 1 wherein the second valve means comprises an atmospheric pressure responsive valve arranged in the atmospheric pressure line so as to permit air flow therethrough only when the atmospheric pressure is greater than said predetermined pressure.

6. An ignition timing adjusting apparatus according to claim 1 wherein the first and second actuators are mounted coaxially in tandem.

7. In an ignition timing adjusting system for a spark-ignition internal combustion engine having an ignition timer element, an intake tube for delivering a mixture of fuel and air to the engine, and a throttle valve located in the intake tube, the system including a first vacuum actuator having a first air-tight diaphragm chamber, the first actuator being connected to the ignition timer element of the internal combustion engine for advancing the timing of the engine in response to increasing vacuum in the first chamber, a first vacuum line leading from the first actuator chamber and connected to a first vacuum port located downstream relative to the throttle valve in the intake tube, and an atmospheric pressure line leading from the first actuator chamber to the atmosphere, wherein the improvement comprises:

a first one-way valve arranged in the first vacuum line so as to allow air flow therethrough from the first actuator chamber but to prevent flow in the reverse direction for opening said first vacuum line only when the absolute valve of the vacuum in the intake tube at the first intake port is greater than the absolute value of the vacuum in the first actuator chamber, a second vacuum actuator having a second air-tight diaphragm chamber, the second actuator being mounted coaxially in tandem with the first vacuum actuator and connected to the ignition timer element to advance the timing of a spark-ignition internal combustion engine in response to increasing vacuum in the second chamber independently of said first actuator; and a second vacuum line leading from the second chamber and connected to a second vacuum port located closely upstream of the closed position of the throttle valve in the inlet tube of the engine, a second atmospheric pressure responsive valve arranged in the atmospheric pressure line so as to permit air flow therethrough only when the atmospheric pressure is greater than a predetermined pressure corresponding to a preselected altitude; and air flow restricting means arranged along said first vacuum line for restricting air flow through the first vacuum port into the intake tube when the second valve means is open, to assure that the actuator chamber is subjected to atmospheric pressure, the first actuator being adjusted to provide a maximum ignition timing advance greater than the maximum advance provided by the second actuator, so that whenever the atmospheric pressure is less than said predetermined pressure, the first and second valve means will maintain the vacuum in the first actuator chamber at the maximum value of vacuum at the first vacuum port, whereby the first actuator will provide said maximum ignition timing advance for all engine operating conditions whenever the atmospheric pressure is less than said predetermined pressure, and whenever the first actuator chamber is exposed to atmospheric pressure, the second actuator will provide ignition advance according to engine load.

* * * * *

UNITED STATES PATENT AND TRADEMARK OFFICE
CERTIFICATE OF CORRECTION

PATENT NO. : 4,151,818
DATED : May 1, 1979
INVENTOR(S) : Hidenori Tateno

It is certified that error appears in the above–identified patent and that said Letters Patent are hereby corrected as shown below:

Col. 1, line 38, change "present" to --preset--

Col. 2, line 61, change "an" to --at--

Col. 9, line 11, change "of FIgS" to --in FIGS--

Col. 9, line 47, correct spelling of "function".

Col. 12, line 7, correct spelling of "throttle".

Signed and Sealed this

Fifteenth Day of December 1981

[SEAL]

Attest:

Attesting Officer

GERALD J. MOSSINGHOFF
Commissioner of Patents and Trademarks